Nov. 1, 1938.   J. M. GOLDBERG   2,134,938
SCRIBER FOR MOVING PICTURE FILMS
Filed Sept. 30, 1937

INVENTOR.
Jacob M. Goldberg.
BY Martin E. Anderson
ATTORNEY.

Patented Nov. 1, 1938

2,134,938

UNITED STATES PATENT OFFICE 2,134,938

SCRIBER FOR MOVING-PICTURE FILMS

Jacob M. Goldberg, Denver, Colo.

Application September 30, 1937, Serial No. 166,673

6 Claims. (Cl. 33—27)

This invention relates to improvements in devices for scribing moving picture films.

Moving picture films are subject to hard usage and finally become worn or scratched to such an extent that they can no longer be used with satisfactory results. After films reach this stage they should be withdrawn from further use, as their use even by small and out of the way theaters, usually results harmfully.

The emulsified surface frequently becomes damaged, so as to preclude further use, long before the Celluloid has hardened, and it is therefore possible to employ the latter for leaders, etc.

Since the emulsion contains a high percentage of silver, it is usually reclaimed and the cleaned film used for any purpose for which it is suited.

In order to mark films, that have been worn or damaged, in such a way that they can be readily identified and so as to prevent them from being exhibited successfully in any theater, their emulsified surfaces are scratched by means of scribers so as to produce a wavy line that will be clearly apparent on the screen, and which is also clearly visible when the film is inspected.

It is the object of this invention to produce a device that can be positioned between the supply and the rewind reels of a film rewind device and by means of which the film can be scribed with a wavy line of sine curve shape, when it is found to be so worn or damaged that it should be withdrawn from further use.

The invention, briefly described, comprises a base on which is mounted for rotation two rollers, one having flanges for guiding the film and the other having sprocket teeth for engaging with the film sprockets. A scriber is mounted on the base in position to contact the upper surface of the film. When the film is moved longitudinally, it will cause the toothed roller to rotate and by suitable means, reciprocate the scriber transversely of the film, whereby it will make a sine wave curved line in the emulsion of the film.

Having thus briefly described the invention, the same will now be described in detail, and for this purpose reference will be had to the accompanying drawing in which the preferred form of the invention has been illustrated and in which.

Figure 1:
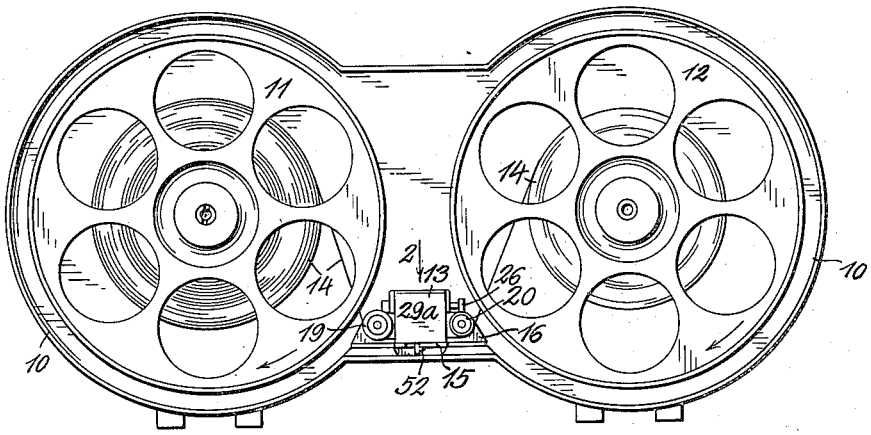
Figure 1 shows a side elevation of a film rewind apparatus with the scriber device in place.
Figure 2:
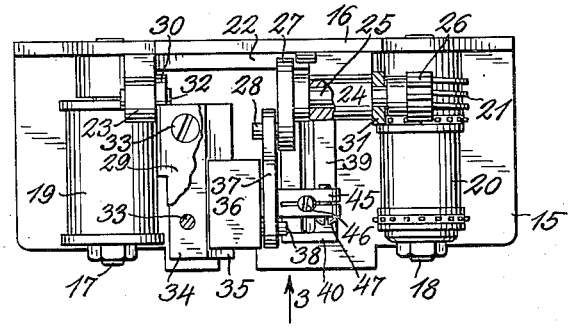
Figure 2 is a top plan view of the scriber device looking in the direction of arrow 2, Fig. 1, parts thereof having been broken away to better disclose the construction.

In the drawing numeral 10 designates the housing of a film rewind apparatus in which are mounted for rotation a supply reel 11 and a rewind reel 12.

The housing 10 represents a base for supporting the reels and the rewind device 13 and may be of any other suitable construction. In the apparatus illustrated the rewind reel 12 is motor driven but may be rotated by hand if desired.

The scribing device 13 is secured to the base 10 at a point between the reels. The film 14 is wound on the reels with the emulsion surface on the outside and this surface is therefore on top when the film is passed through the scribing device.

Since the invention relates to the scribing device, it will now be described in detail.

Figure 4:
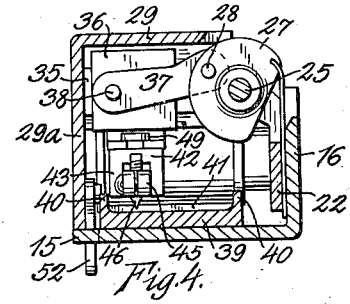
Figure 4 is a section taken on line 4—4 Fig. 3.

The scriber device comprises a base 15 of angle cross section, as clearly shown in Fig. 4. The upwardly extending flange of the base has been designated by numeral 16. Secured to the flange 16 are two stub shafts 17 and 18 on which are rotatably mounted respectively a flanged guide roller 19 and a toothed roller 20. The rollers are provided with suitable antifriction bearings which have not been illustrated as they do not affect the novelty of the invention. The inner end of the toothed roller 20 is provided with a worm 21.

Attached to the inner surface of the flange 16 is a separate member 22 having integral bearings 23 and 24 having a common axis that is positioned above the rollers and is perpendicular to the axes of the rollers. A crank shaft 25 is rotatably mounted in bearing 24 and has one end provided with a worm gear 26; the other end carries a crank disk 27 which has a crank pin 28.

A cover member 29 of angular cross section, is provided with perforated lugs 30 and 31. A hinge pin 32 connects the lug 30 with the bearing 23 and the crank shaft 25 extends through the lug 31. Shaft 25 and pin 30 serve as hinge pins about which the cover 29 can be rotated.

Attached to the cover 29, by screws 33 is a cross head guide block 34 having a dove tail guide 35 on one side. Slidably connected with the guide 35 is a cross head 36. A connecting rod 37 has one end connected with the crank pin 28 and the other with the pivot pin 38 which projects from the cross head.

It is now apparent that when the roller 20 is rotated it will cause the crank shaft 25 to rotate and the connecting rod will impart to the cross head a reciprocatory movement along the guide 35. If the connecting rod were long or if it were replaced by a Scotch yoke, the movement of the cross head would be a simple harmonic motion, but owing to the shortness of the connecting rod, the movement varies somewhat from a simple harmonic movement.

The upper surface of base 15 is provided with a transverse projection 39 whose upper surface is positioned in or slightly above a plane tangent to the outer surface of the rollers. The ends of member 39 project upwardly so as to form guides 40 and the upper surface of member 39 has a longitudinal groove 41. When the film is connected with the scribing device it passes beneath the rollers and over the upper surface of member 39 in the manner indicated by dotted lines in Fig. 3.

Figure 5:
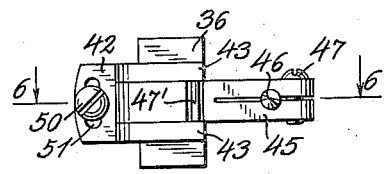
Figure 5 is a bottom plan view looking in the direction of arrow 5 in Fig. 6.
Figure 6:
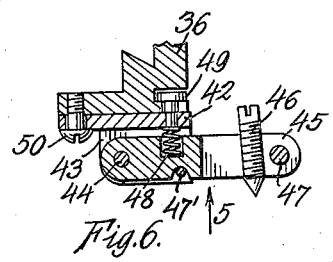
Figure 6 is a section taken on line 6—6 Fig. 5.
Figure 3:
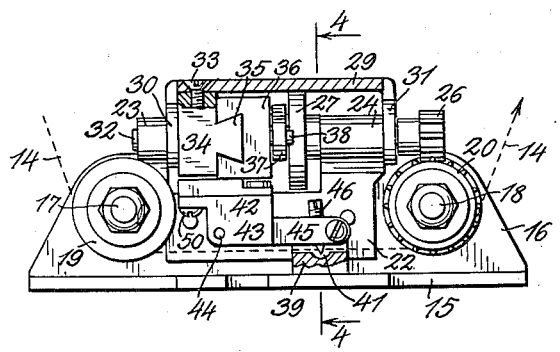
Figure 3 is a front elevation of the scriber device, looking in the direction of arrow 3 in Fig. 2, parts thereof being broken away to better disclose the construction.

Referring now more particularly to Figs. 3, 5 and 6, it will be seen that there is attached to the under side of the cross head 36 an assembly comprising a base 42 having spaced parallel sides 43 that are perforated to receive a pivot pin 44 to which is hinged an arm 45 whose free end is split and provided with a threaded opening for the reception of the scriber pin 46. The two parts of the split end are clamped onto the scriber pin by means of a screw 47. The lower surface of arm 45 has a transverse notch for the reception of a pin 47' that serves as a stop to limit downward movement. A spring 48 tends to move the arm 45 downwardly against the stop. Base 42 is secured to the cross head by the headed pin 49 and the screw 50, the latter extends through an elongated opening 51 in base 42 so that the base can be adjusted about the axis of pin 49.

The cover 29 has a downwardly projecting flange 29a that closes the front side in the manner shown in Figs. 1 and 4 and is provided with a latch 52 that holds it in closed position.

The operation of the device is as follows:

The film is passed underneath the rollers 19 and 20 and over the top of member 39 in the manner shown in Fig. 3. When the rewind reel 12 is rotated clockwise, the film will move from left to right in Fig. 3 and will rotate the roller 20, which in turn rotates the drive shaft and reciprocates the cross head and the scriber 46, which rests on the emulsified surface of the film. The result of this action is that the scriber will trace a sine curve in the emulsion which will effectively destroy the films further usefulness for exhibition purposes and will assure that the damaged and worn film will not be sent out by mistake.

Attention is called to the rugged construction and in particular to the cross head that is mounted on the dove tail guide 35 for rectilinear reciprocatory movement. The crank and connecting rod means for effecting reciprocation of the cross head with its attached scriber gives a positive movement that approaches closely to a simple harmonic motion. The device can be moved into such position that the film can be readily inserted and removed by simply turning the cover about its hinge pins.

Attention is directed to the fact that the rollers are secured to the base and are always in the position shown so that the film can be properly adjusted with respect to the sprocket teeth before the scriber is brought into position, which has many advantages from the viewpoint of the operator.

The structure has been designed with the object of obtaining strength and efficiency and at the same time make it as simple to manufacture and assemble as possible.

Having described the invention what I claim as new is:

1. In a film rewind device having a supply reel and a rewind reel mounted to rotate on spaced parallel axes, a film scribing mechanism, positioned between the reels, comprising, in combination, a base, two rollers mounted thereon for rotation about spaced parallel axes, one of the rollers having sprocket teeth for engagement with the sprocket holes of a film, a scriber mounted for rectilinear reciprocating movement in a direction substantially parallel with the axes of the rollers, and means driven by the rotation of the toothed roller for reciprocating the scriber with a substantially simple harmonic motion.

2. In a film rewind device having a supply reel and a rewind reel mounted to rotate on spaced parallel axes, a film scribing mechanism, positioned between the reels, comprising, in combination, a base, two rollers mounted thereon for rotation about spaced parallel axes, one of the rollers having sprocket teeth for engagement with the sprockets of a film, a scriber mounted for rectilinear reciprocating movement in a direction substantially parallel with the axes of the rollers, and means comprising a crank pin driven by the rotation of the toothed roller, and a connecting rod joining the crank pin with the scriber for imparting to the latter a slightly modified simple harmonic reciprocating motion when the toothed roller is rotated.

3. In a film rewind device having a supply reel and a rewind reel mounted to rotate on spaced parallel axes, a film scribing mechanism, positioned between the reels, comprising, in combination, a base, two rollers mounted thereon for rotation about spaced parallel axes, one of the rollers having sprocket teeth for engagement with the sprockets of a film, a scriber mounted for rectilinear reciprocating movement in a direction substantially parallel with the axes of the rollers, and means for reciprocating the scriber with a slightly modified simple harmonic motion at a speed directly proportional to the speed at which the toothed roller is rotated, comprising a shaft mounted for rotation about an axis substantially perpendicular to the axis of the rollers and positioned above the latter, one end of the shaft having a crank pin, the other end thereof having a worm gear, the toothed roller having a worm cooperating with the worm gear, and means for transmitting motion from the crank pin to the scriber.

4. A film scribing device, comprising in combination, a base, two rollers carried by the base for rotation about spaced parallel axes, the upper surface of the base having a portion extending along a plane substantially parallel to a plane tangent to the lower surfaces of the rollers to form a support for a moving film, one of the rollers having sprocket teeth for engaging the sprocket teeth of a film, the toothed roller having one end provided with a worm, a crank shaft bearing carried by the base, the axis of the bearing being above the worm of the toothed roller and substantially perpendicular thereto, a crank shaft mounted in the bearing, one end of the shaft having a worm gear in operative engagement with the worm, the other end having a crank pin, a guide having one end mounted for pivotal movement about the axis of the crank shaft, a cross head slidably mounted on the guide for movement in a plane substantially normal to the axis of the crank shaft, a connecting rod having one end pivoted to the cross head and the other connected with the crank pin whereby the cross head will be reciprocated when the crank shaft is rotated, and a scriber carried by the cross head for engaging the upper surface of a film as it passes through the device.

5. A film scribing device, comprising in combination, a base, two rollers carried by the base for rotation about spaced parallel axes, the upper surface of the base having a portion extending along a plane substantially parallel to a plane tangent to the lower surfaces of the rollers to form a support for a moving film, one of the rollers having sprocket teeth for engaging the sprocket teeth of a film, the toothed roller having one end provided with a worm, a crank shaft bearing carried by the base, the axis of the bearing being above the worm of the toothed roller and substantially perpendicular thereto, a crank shaft mounted in the bearing, one end of the shaft having a worm gear in operative engagement with the worm, the other end having a crank pin, a guide having one end mounted for pivotal movement about the axis of the crank shaft, a cross head slidably mounted on the guide for movement in a plane substantially normal to the axis of the crank shaft, a connecting rod having one end pivoted to the cross head and the other connected with the crank pin whereby the cross head will be reciprocated when the crank shaft is rotated, a scriber carried by the cross head for engaging the upper surface of a film as it passes through the device, resilient means for urging the scriber towards the base, and a stop for limiting the downward movement.

6. A film scribing device, comprising in combination, a base, two rollers carried by the base for rotation about spaced parallel axes, the upper surface of the base having a portion extending above a plane substantially parallel to a plane tangent to the lower surfaces of the rollers to form a support for a moving film, one of the rollers having sprocket teeth for engaging the sprocket teeth of a film, the toothed roller having one end provided with a worm, a crank shaft bearing carried by the base, the axis of the bearing being above the worm of the toothed roller and substantially perpendicular thereto, a crank shaft mounted in the bearing, one end of the shaft having a worm gear in operative engagement with the worm, the other end having a crank pin, a guide having one end mounted for pivotal movement about the axis of the crank shaft, a cross head slidably mounted on the guide for movement in a plane substantially normal to the axis of the crank shaft, a connecting rod having one end pivoted to the cross head and the other connected with the crank pin whereby the cross head will be reciprocated when the crank shaft is rotated, a scriber carried by the cross head for engaging the upper surface of a film as it passes through the device, resilient means for urging the scriber towards the base, a stop for limiting the downward movement, and means for effecting an adjustment of the scriber relative to the base.

JACOB M. GOLDBERG.